US011235636B1

(12) United States Patent
Swift et al.

(10) Patent No.: US 11,235,636 B1
(45) Date of Patent: Feb. 1, 2022

(54) BUSHING AND A KIT FOR ASSEMBLING A BUSHING

(71) Applicant: RB Distribution, Inc., Colmar, PA (US)

(72) Inventors: Devin Michael Swift, Drexel Hill, PA (US); John Thomas Malone, III, Hillsborough, NJ (US); Thomas Allan Reiff, Portage, MI (US); David Peter Cimbolo, Lake Harmony, PA (US)

(73) Assignee: RB Distribution Inc., Colmar, PA (US)

(*) Notice: Subject to any disclaimer, the term of this patent is extended or adjusted under 35 U.S.C. 154(b) by 0 days.

(21) Appl. No.: 17/237,264

(22) Filed: Apr. 22, 2021

(51) Int. Cl.
*B60G 21/055* (2006.01)

(52) U.S. Cl.
CPC .. *B60G 21/0551* (2013.01); *B60G 2204/1222* (2013.01); *B60G 2204/41* (2013.01)

(58) Field of Classification Search
CPC ........ B60G 21/0551; B60G 2204/1222; B60G 2204/41

USPC .................................................. 280/124.106
See application file for complete search history.

(56) References Cited

U.S. PATENT DOCUMENTS

| 6,796,586 | B2 * | 9/2004 | Werth .................... F16L 33/225 285/243 |
| 10,159,875 | B2 * | 12/2018 | Milleman ............... A63B 53/00 |
| 10,363,609 | B2 * | 7/2019 | Rubens ................. B23B 31/223 |
| 2010/0102552 | A1 * | 4/2010 | Lockhart ............... F16L 11/085 285/256 |
| 2017/0224106 | A1 * | 8/2017 | Sabounjian .......... A47B 57/545 |

* cited by examiner

*Primary Examiner* — Toan C To
(74) *Attorney, Agent, or Firm* — Volpe Koenig

(57) ABSTRACT

The disclosed bushing assembly has a housing with a central bore for receiving a bushing sleeve that is dimensioned to fit a predetermined sway bar. The housing and sleeve have various combinations of mating projections and recesses that secure the sleeve in the housing. A bushing kit has a plurality of sleeves that are dimensioned to fit different predetermined sway bars and an appropriate sleeve can be selected at the time of installation. The housing and the sleeve are flexible.

7 Claims, 8 Drawing Sheets

US 11,235,636 B1

BUSHING AND A KIT FOR ASSEMBLING A BUSHING

FIELD OF INVENTION

The present invention relates generally to a bushing for securing a stabilizer or sway bar to a motor vehicle frame. Most specifically, the invention relates a bushing kit that provides a plurality of bushing sleeves that enable the installer to select the appropriate sleeve for a specific sway bar. Most specifically, the invention relates to a split bushing housing and a split bushing sleeve that have mating features that secure the bushing sleeve against rotation in the bushing housing.

BACKGROUND

It is known in the motor vehicle art to employ a stabilizer mechanism, often referred to as a sway bar, to control a vehicle's sway during turns and improve handling. During vehicle sway, the sway bar is subjected to a rotational movement that counters the downward movement of the vehicle's outer wheel. During this operation, the sway bar bushing must permit sway bar movement while securing the sway bar to the vehicle. In the present state of the art, each sway bar bushing is sized to a specific sway bar. As a consequence, the automotive supply house or repair shop must maintain in inventory a number of different bushings at the expense of inventory space and to avoid down time in waiting for the appropriate bushing if it is not in inventory.

SUMMARY

In view of the foregoing, the applicant has recognized that there is a need for a bushing kit with multiple bushing sleeves can be assembled with and common housing to provide savings in inventory space and down time. The applicant's solution provides a slotted housing that has an inner diameter that complements the outer diameter of a plurality of slotted bushings. Each of the slotted bushings has a predetermined inner diameter that is dimension to receive a predetermined stabilizer bar. The slotted housing and the slotted bushing also have complementary recesses and projections that prevent the selected bushing from rotating within the housing.

DETAILED DESCRIPTION OF THE PREFERRED EMBODIMENTS

Figure 1:
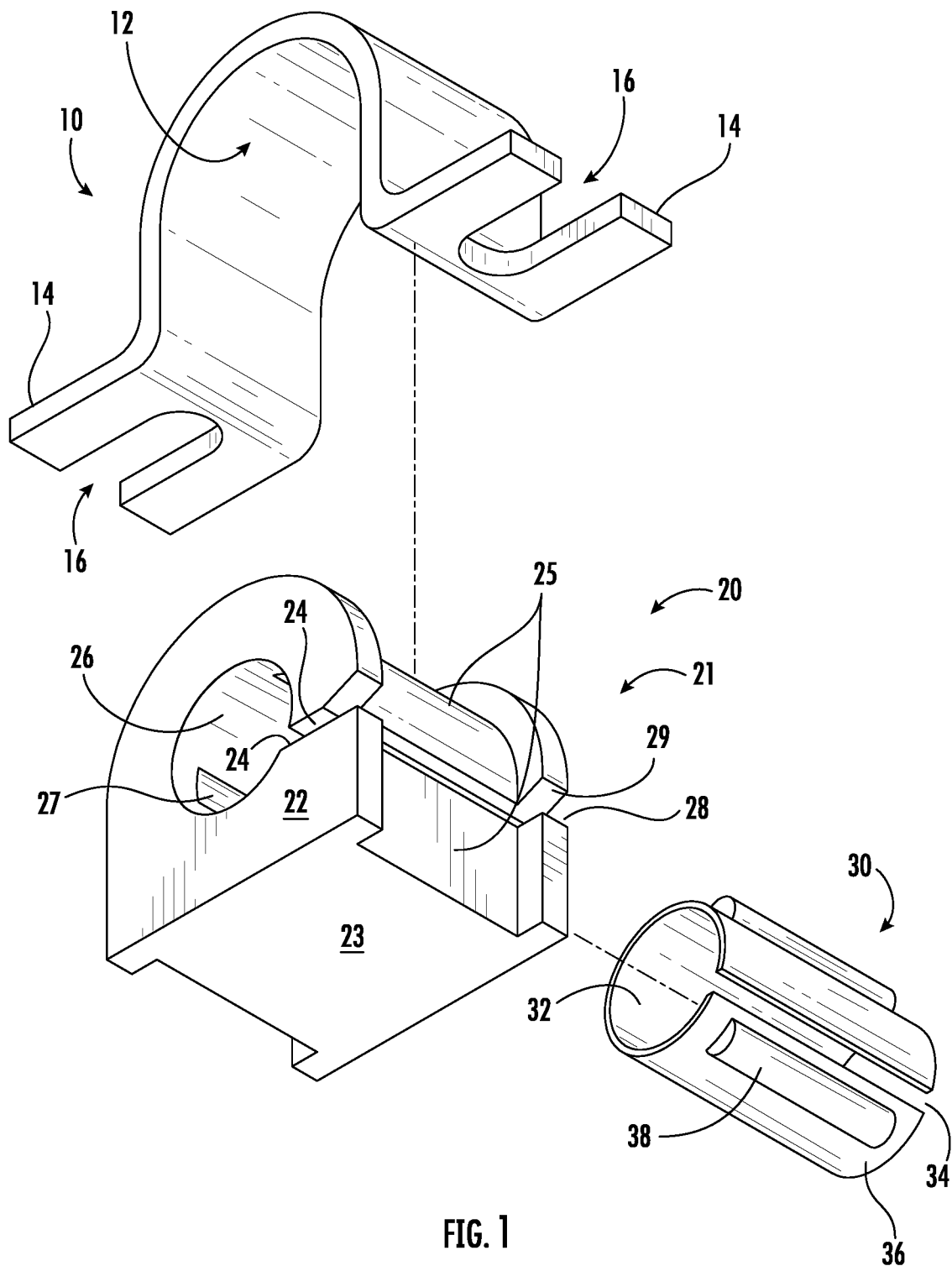
FIG. 1 is an exploded view of exemplary components for a bushing according to the invention.

Referring now to FIG. 1, there is shown an exploded view of the clamp 10, housing 20, and sleeve 30 that comprise the components of a bushing assembly. The clamp 10 has an arched or "U" shaped center portion 12 that is dimensioned to fit over the housing 20. The clamp 10 has two generally horizontal arms 14 that form the bae of the arched center 12. Each of the arms 14 has a slot 16 that is dimensioned to receive a fastener that will secure the clamp 10 to a vehicle.

Still with reference to FIG. 1, The body 20 has a curved upper portion 21 with recesses 25 that are dimensioned to receive the arched center portion 12. The lower portion 22 of housing 20 is generally rectangular with a flat or planar bottom surface 23. The middle portion of housing 20 has a through opening or bore 26 that extends across the body 20. Within the through bore 26 there is at least one recess 27 that is dimensioned to mate a projection 38 on sleeve 30 in male-female connection. If desired, the projection may be in the through bore 26 and the recess may be in the sleeve 30. The choice will depend on the thickness of the sleeve 30.

Still with reference to FIG. 1, the upper portion 21 and lower portion 22 are split by the slot 28 that extends across the housing 20 so that the upper portion 21 and lower portion 22 are separated and can be spread apart. The upper portion 21 and lower portion 22 have opposed flat faces 24. If desired, the relief 29 may be provided to assist in slipping the bushing assembly 20 over a stabilizer bar.

Still with reference to FIG. 1, the representative sleeve 30 has a central opening 32 that has a diameter selected to fit around a selected stabilizing bar and form the bushing surface. A slot 34 splits the sleeve 30 so it can be spread apart. The outer diameter 36 of sleeve 30 is selected to fit within the bore 26. There is at least one projection 38 that is dimensioned to fit within a recess 25 and prevent rotation of the sleeve 30 within the body 20. Multiple sleeves 30 are provided in a kit with each of the sleeves having a different predetermined through bore that is selected to complement a selected stabilizing bar. The stabilizer bar bushing assembly for a predetermined stabilizer bar is configured by selecting from among multiple bushing sleeves a sleeve 30 that complements the predetermined stabilizer bar and positioning the sleeve 30 within the inner bore of the housing 20, see FIGS. 2 and 3.

Figure 2:
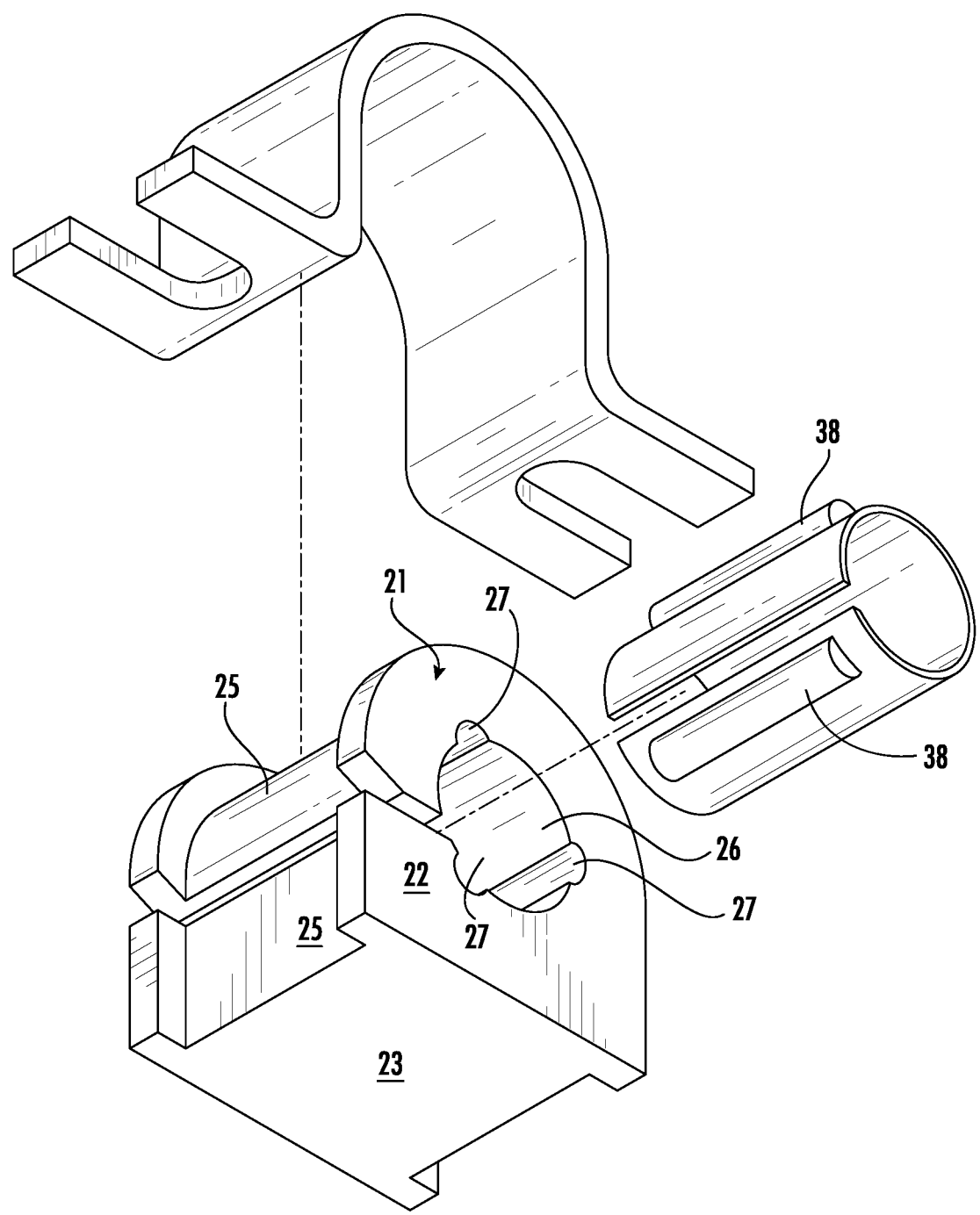
FIG. 2 is an exploded view illustrating the insertion of a busing sleeve in a housing.

With reference to FIG. 2, there is shown an exploded view of the clamp 12, housing 20, and sleeve 30 that comprise the components of the bushing assembly from the opposite side of FIG. 1. In this FIG. 2 view, it can be seen that the recess 27 in the housing 20 extends through the one side so the projection 38 on sleeve 30 can be inserted in the housing 20.

Figure 3:
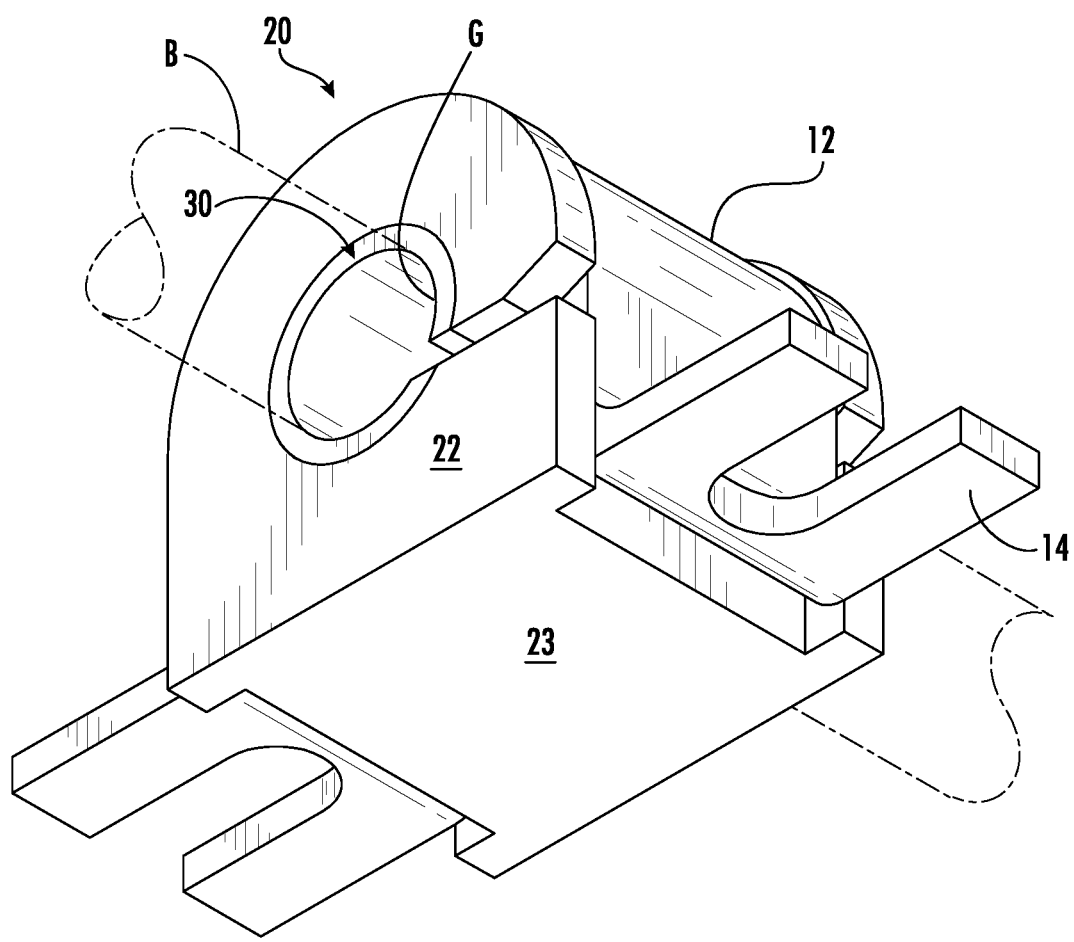
FIG. 3 illustrates an assembled bushing prior to closing.
Figure 4:
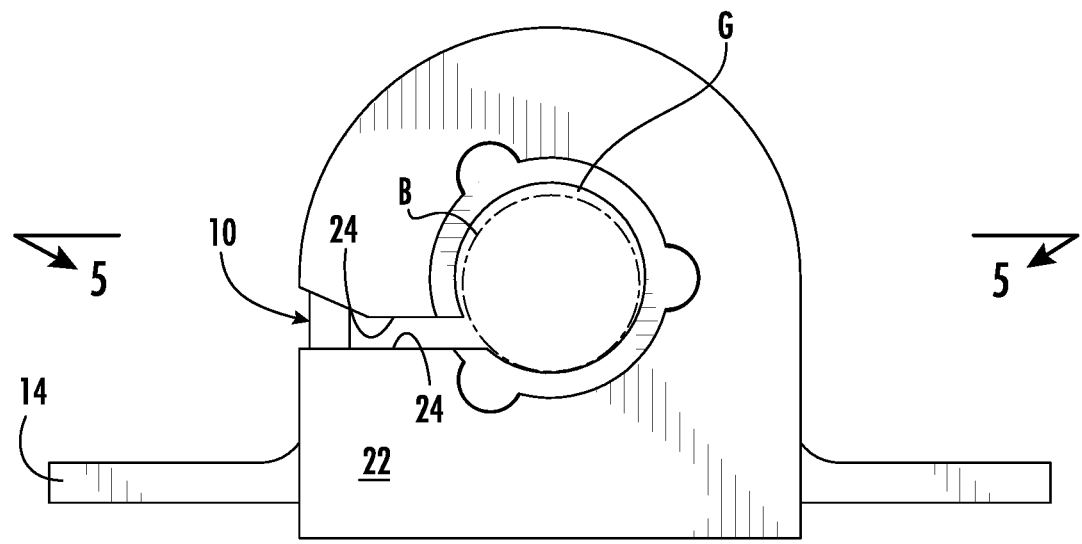
FIG. 4 is a plane view showing the opposite side of the assembled bushing assembly in FIG. 3.
Figure 5:
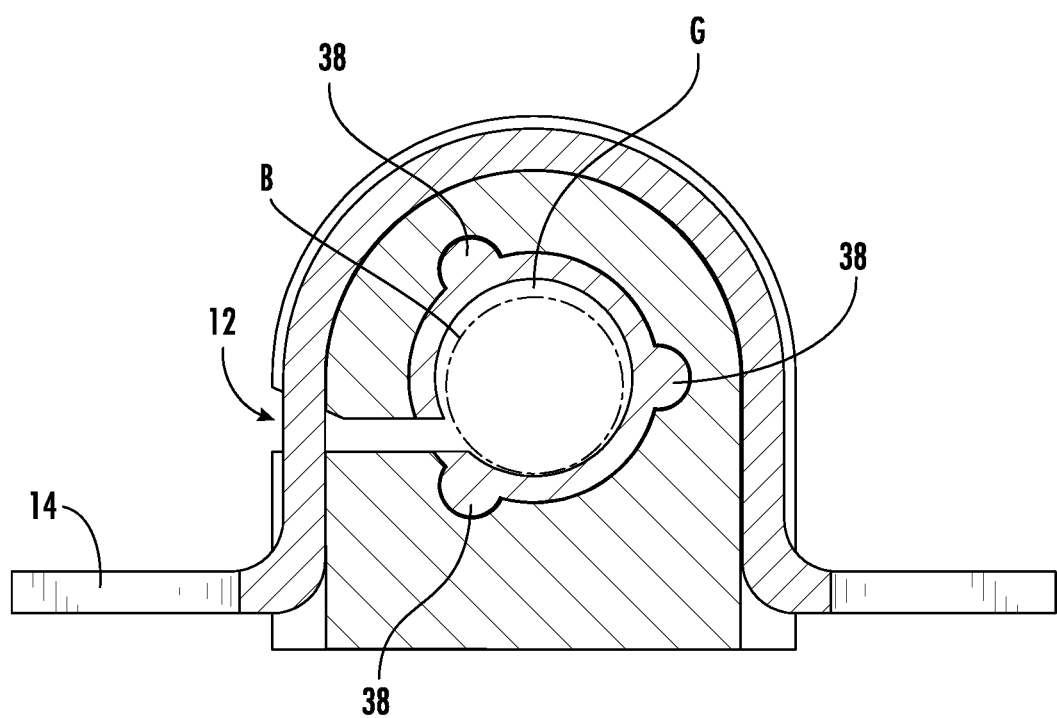
FIG. 5 is a section view of the assembled bushing along the line 5-5 in FIG. 4.
Figure 6:
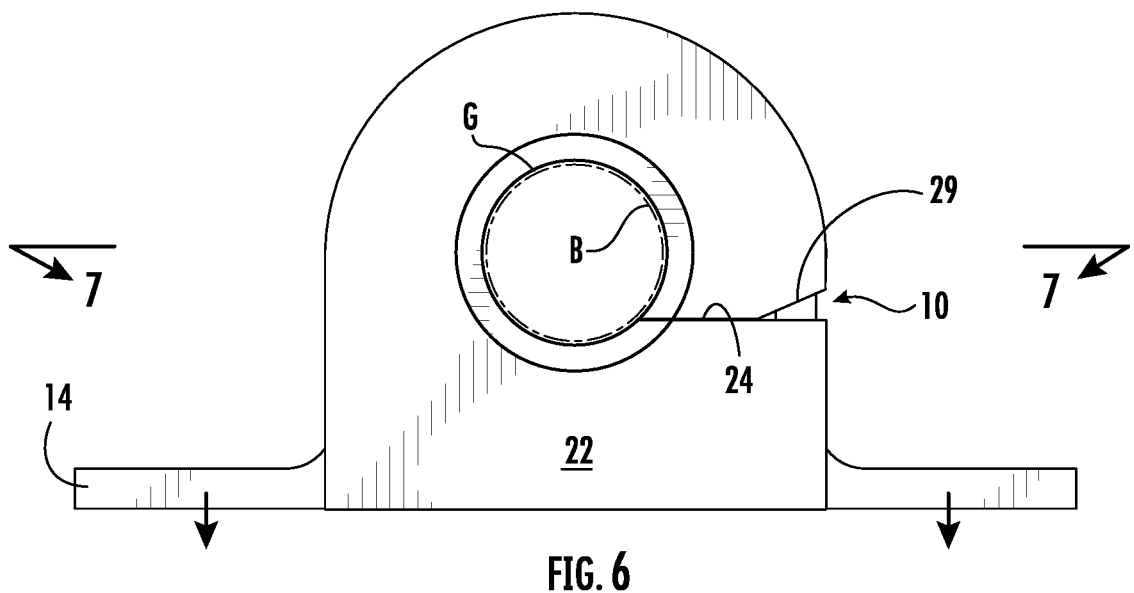
FIG. 6 illustrates an assembled bushing after closing.
Figure 7:
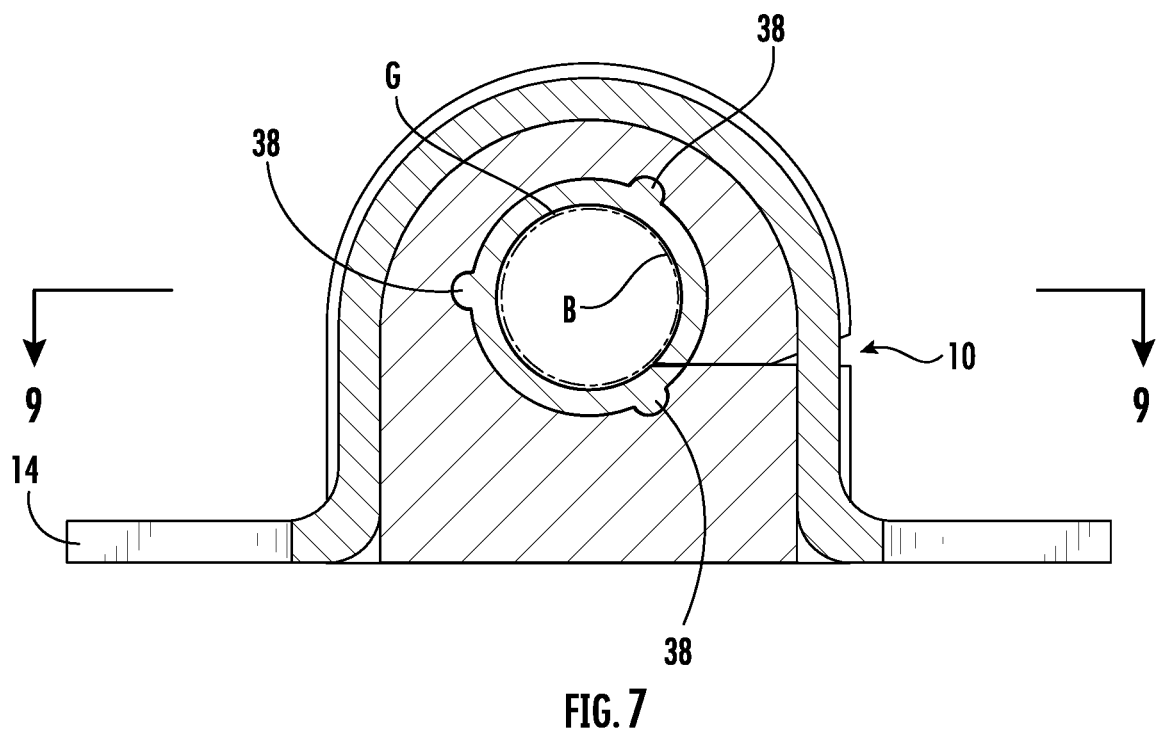
FIG. 7 is a section view of the assembled bushing along the line 7-7 in FIG. 6.

With reference to FIG. 3, a bushing assembly is shown mounted on a stabilizing bar prior to the clamp 12 being fastened to a vehicle. As can be seen in FIGS. 3, 4, and 5, the section of bar B is within the sleeve but there remains a gap "G" between the inner diameter 32 of sleeve 30 and the bar. When the arms 14 of clamp 12 are secured to a vehicle frame, such as threaded bolts and nuts, the flat faces 24 are drawn to each other and the gap G is eliminated. This final configuration is shown in FIGS. 6 and 7.

Figure 8:
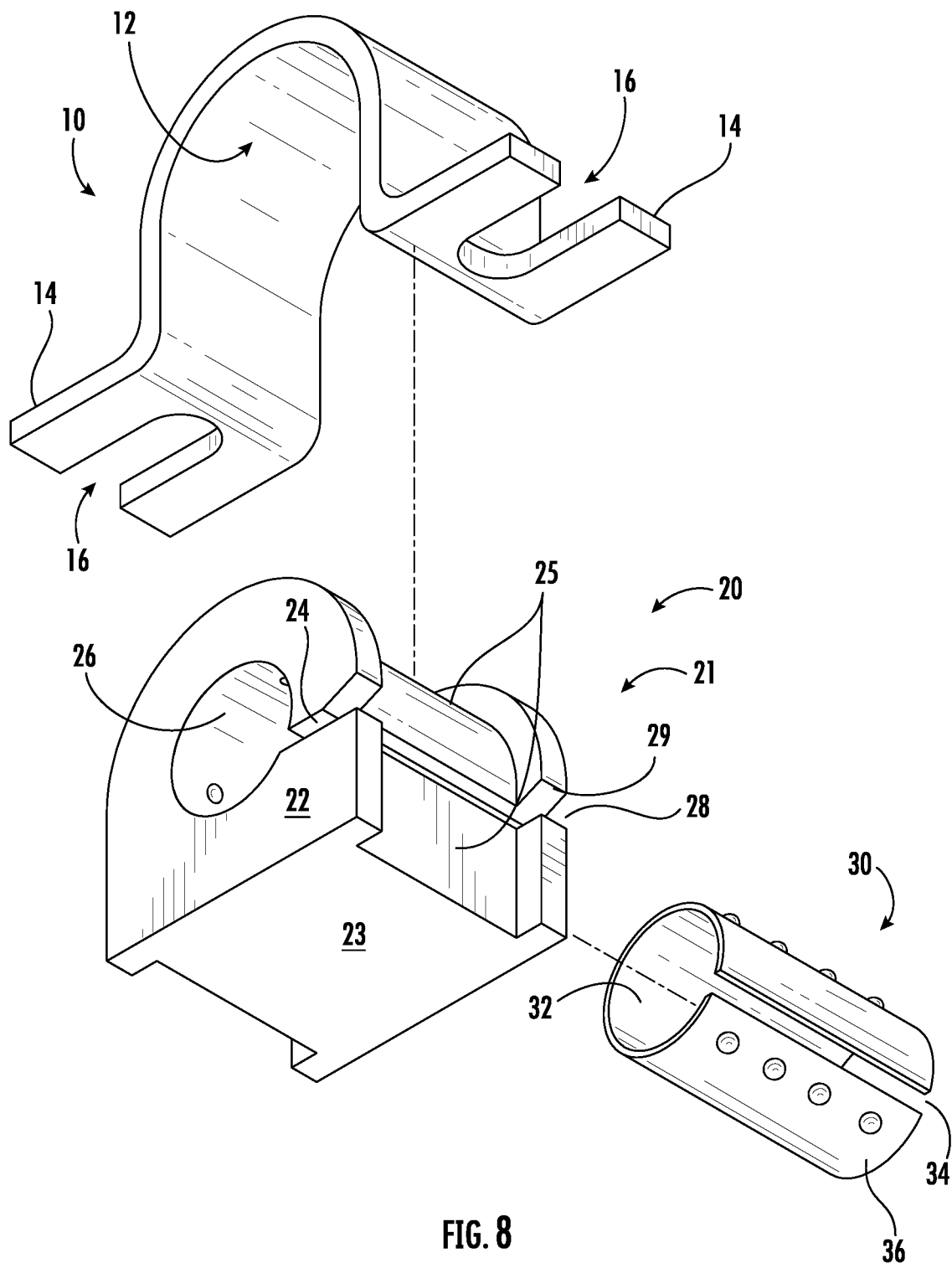
FIG. 8 is an exploded view of exemplary components for an alternative embodiment of a bushing assembly according to the invention.
Figure 9:
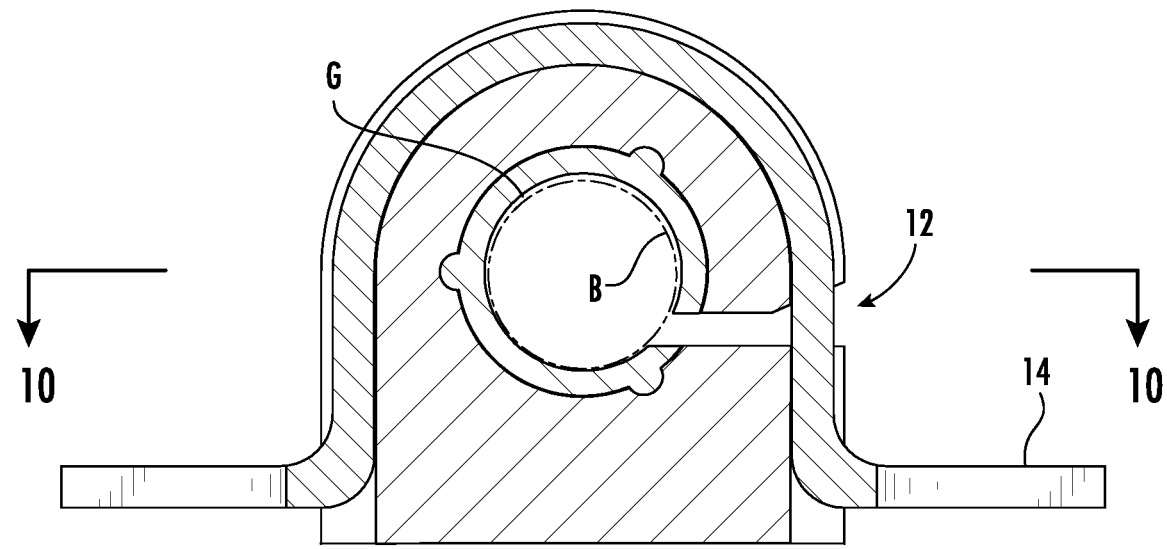
FIG. 9 is a section view through a bushing assembly according to FIG. 7 prior to closing.
Figure 10:
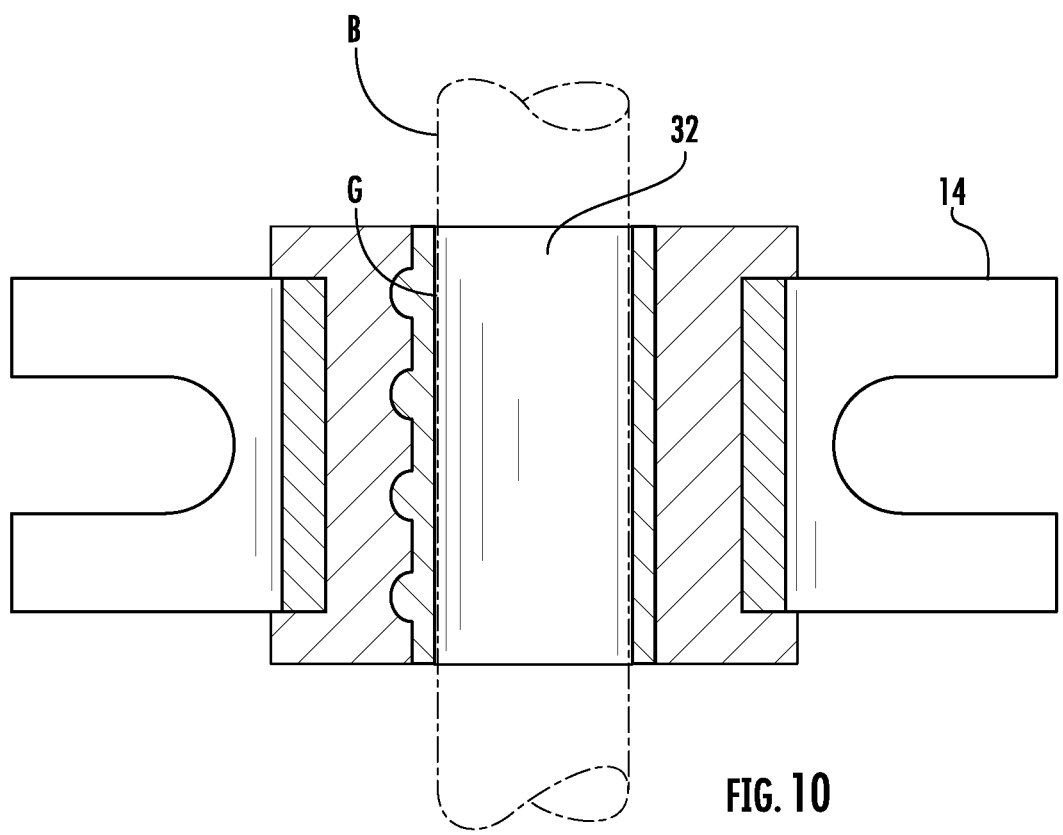
FIG. 10 illustrates a section along the line 10-10 in FIG. 9; and,
FIG. 11 is an exploded view of exemplary components for an alternative embodiment of a bushing assembly according to the invention.

With reference to FIG. 8, there is illustrated and alternative embodiment where the housing 20 has a plurality of recesses 127 and sleeve 130 has a plurality of projections that are dimensioned to fit within the recesses 127. In all other respects, this embodiment is the same as the prior embodiment in FIG. 1.

Figure 11:
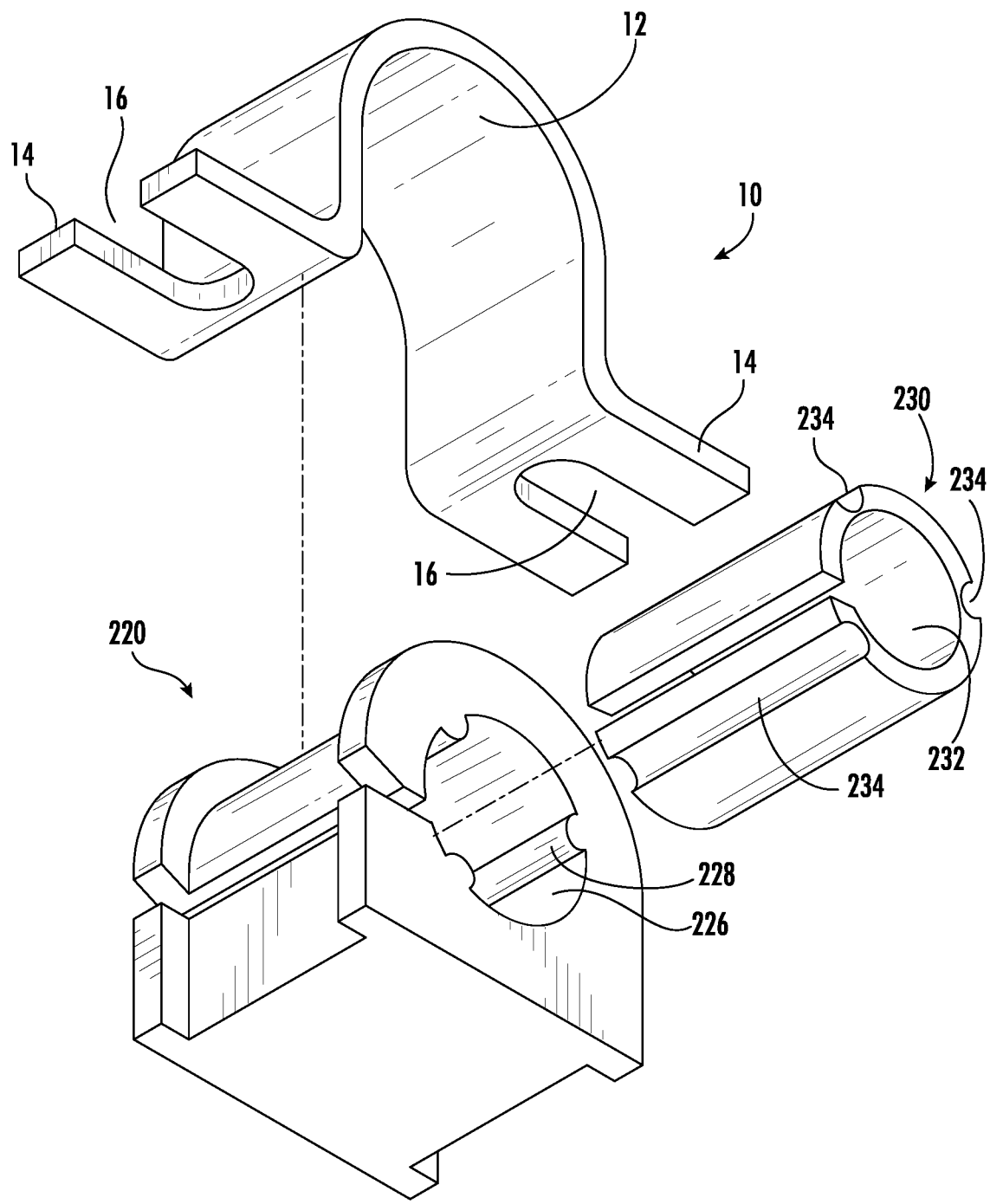

With reference to FIG. 11, there is illustrated and alternative embodiment where the housing 220 has a plurality of projections 228 within an enlarged bore 226 that is sized to receive the sleeve 230. The sleeve 230 has an increased thickness that is selected to provide the body mass for forming a plurality of recesses 234 that are dimensioned to mate with the plurality of projections 228 within the bore 226.

It can be seen from the figures that the mating between the respective projections and recesses will position a sleeve within the housing and prevent the sleeve from rotating within the housing.

Natural rubber or latex is suitable for both the housing and the sleeves and is a common material for bushing of this type.

What is claimed is:

1. A stabilizer bar bushing assembly comprising:
   a split housing having an outer diameter and an inner bore having a predetermined diameter; and
   a plurality of split bushing sleeves that fit within the inner bore of the split housing, each of the bushing sleeves has a different predetermined through bore;
   whereby a stabilizer bar bushing assembly for a predetermined stabilizer bar is configured by selecting from the plurality of bushing sleeves a split bushing sleeve having a through bore that is dimension to complement the predetermined stabilizer bar and positioning the selected split bushing sleeve within the inner bore of the bushing housing.

2. The bushing assembly of claim 1, wherein each of the plurality of bushing sleeves has the same outer diameter.

3. The bushing assembly of claim 1, wherein each of the plurality of split bushing sleeves has at least one projection that is dimension to complement at least one recess defined in the inner bore of the split housing.

4. A sway bar bushing assembly comprising:
   a split housing having an inner bore with a predetermined diameter and at least one of a projection or a recess; and
   a split bushing having an inner bore and an outer surface that fits within the inner bore of the split housing and the outer surface has at least one of a projection or a recess that mates with the at least one of a projection or a recess of the split housing and positions the split bushing sleeve within the inner bore of the split housing.

5. A kit for assembling a sway bar bushing, the kit comprising:
   a slotted housing having an inner bore that has at least one of a male or female element;
   a plurality of slotted inserts that fit within inner bore of the slotted housing, each of the plurality of slotted inserts has at least one of a male or female element on and exterior surface that mates with the at least one of a male or female element of the slotted housing, and an interior diameter that is dimensioned to receive a predetermined sway bar;
   whereby a slotted insert for a predetermined sway bar is assembled by selecting from the plurality of slotted inserts a slotted insert having an interior diameter matching the predetermined sway bar and mating the selected slotted insert with the inner bore of the slotted housing.

6. A sway bar bushing kit comprising:
   a flexible split housing having an inner bore with at least one of a male or female element;
   a plurality of flexible inserts, each of the plurality of flexible inserts has at least one of a male or female element on an exterior surface that mates with the at least one of a male or female element of the flexible housing, and a predetermined interior diameter;
   whereby a bushing for a predetermined sway bar is assembled by mating a selected flexible insert with an interior diameter matching the predetermined sway bar to the flexible housing from the plurality of flexible inserts.

7. The sway bar bushing kit of claim 6, wherein there are at least two flexible split housings and the plurality of flexible inserts has at least two flexible inserts that have the same predetermined interior diameter.

* * * * *